(12) United States Patent
Howarter et al.

(10) Patent No.: US 8,351,759 B2
(45) Date of Patent: Jan. 8, 2013

(54) POWER OUTAGE DVR BACK UP SYSTEM

(75) Inventors: Jamie Howarter, Overland Park, KS (US); Doug Ceballos, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 592 days.

(21) Appl. No.: 12/415,092

(22) Filed: Mar. 31, 2009

(65) Prior Publication Data

US 2010/0247068 A1  Sep. 30, 2010

(51) Int. Cl.
*H04N 5/932* (2006.01)
(52) U.S. Cl. ............... 386/202; 386/113; 386/1; 386/4; 386/18; 386/46; 725/14; 725/58; 725/87; 725/93; 725/94; 725/96
(58) Field of Classification Search ............ 725/14, 725/58, 87, 93, 94, 96; 386/113, 83, 1, 4, 386/18, 46
See application file for complete search history.

(56) References Cited

U.S. PATENT DOCUMENTS

| | | | | |
|---|---|---|---|---|
| 7,149,415 | B2 * | 12/2006 | Thiagarajan et al. | 386/265 |
| 8,006,275 | B1 * | 8/2011 | Poole et al. | 725/96 |
| 2009/0044233 | A1 * | 2/2009 | Brandt et al. | 725/87 |
| 2009/0106406 | A1 * | 4/2009 | Bernard et al. | 709/223 |
| 2009/0245751 | A1 * | 10/2009 | Sato | 386/83 |
| 2010/0001586 | A1 * | 1/2010 | Bernard et al. | 307/65 |

* cited by examiner

*Primary Examiner* — Brandon Hoffman
*Assistant Examiner* — Hee Song
(74) *Attorney, Agent, or Firm* — Patton Boggs LLP

(57) ABSTRACT

Embodiments of the disclosed invention include a system and method for recording television content in the event of a power loss. For example, in one embodiment, an optical network terminal associated with providing video service to the digital video recorder is utilized to backup and store a scheduled television program that occurs during the duration of a power outage affecting the digital video recorder.

20 Claims, 7 Drawing Sheets

POWER OUTAGE DVR BACK UP SYSTEM

BACKGROUND OF THE INVENTION

The disclosed invention is related to the field of digital video recorders (DVR). A digital video recorder is an electronic device used to record television programming. A digital video recorder works similar to, and is about the same size as a video cassette recorder (VCR), but instead of recording to a video cassette tape, a DVR uses a hard disk drive for storing television programming data. Currently, if a digital video recorder loses power while recording, the content broadcasted during the power outage is not recorded.

SUMMARY

Embodiments of the disclosed invention include a system and method for recording television content in the event of a power loss. In one embodiment, a method performed by an optical network terminal is disclosed that includes monitoring for a power outage affecting a digital video recorder associated with the optical network terminal. In response to detecting the power outage, the method determines whether the digital video recorder is scheduled to record a program during a time coinciding with the power outage. In response to determining that the digital video recorder is scheduled to record a program during the time coinciding with the power outage, the method maintains video service on the optical network terminal and stores video data corresponding to the program on a data storage unit associated with the optical network terminal during the time of the power outage. The method transfers the stored video data corresponding to the program from the data storage unit to the digital video recorder after power is restored to the digital video recorder.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments seeks to provide a solution for backing up television content that is being recorded or is scheduled to be recorded during a power outage. For example, as will be further described, in accordance with one embodiment, an optical network terminal communicatively coupled to a digital video recorder/set top box monitors for a power outage affecting the digital video recorder and locally stores television content on the optical network terminal for the digital video recorder during the power outage. After power is restored to the digital video recorder, the stored television content is passed from the optical network terminal to the digital video recorder.

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
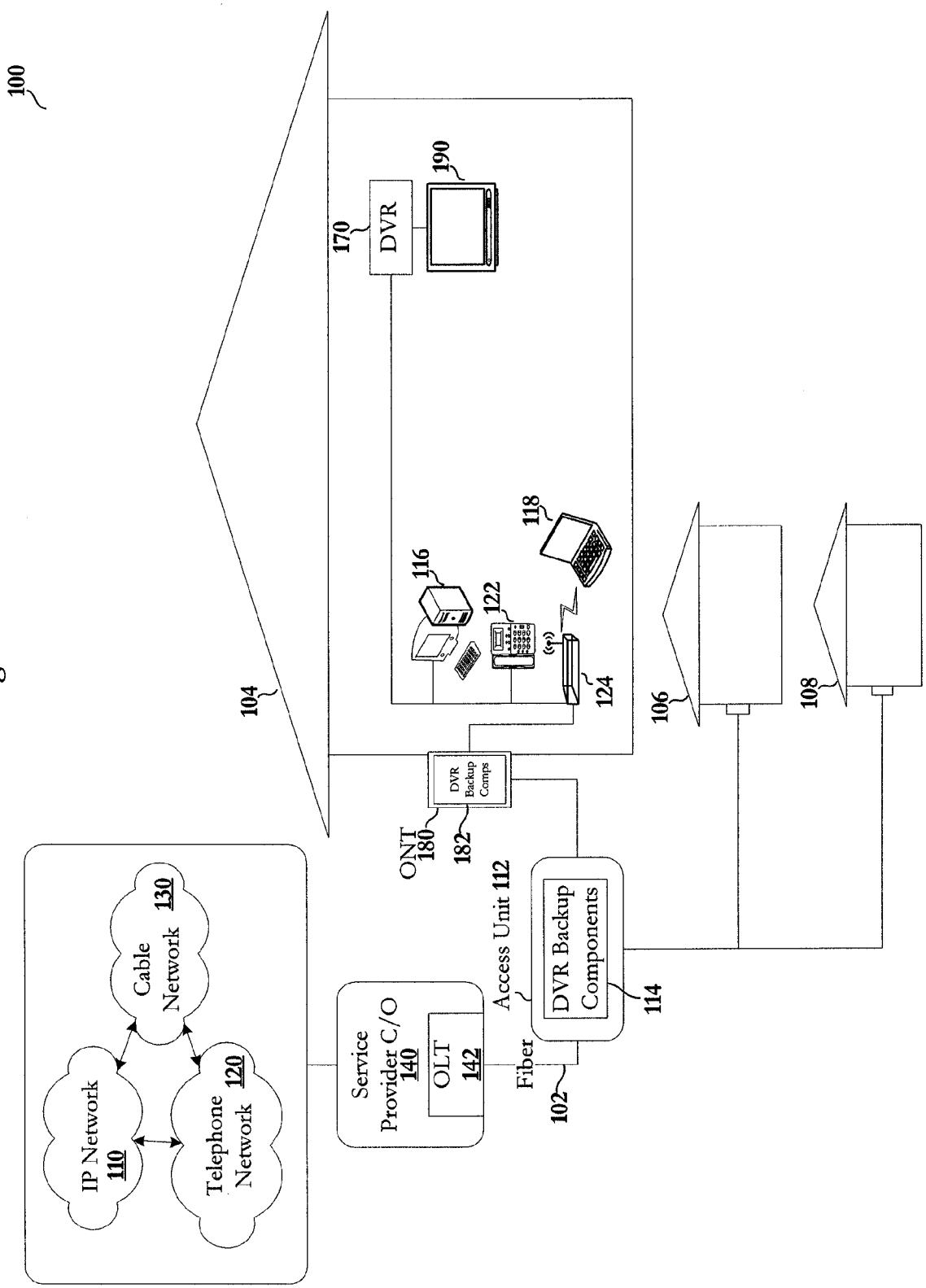
FIG. 1 depicts an embodiment a network environment in which the illustrative embodiments may be implemented.

FIG. 1 depicts an embodiment a network environment 100 in which the illustrative embodiments may be implemented. In one embodiment, network environment 100 is a passive optical network (PON). A passive optical network will is a point-to-multipoint network architecture in which unpowered optical splitters are used to enable a single optical fiber 102 to serve multiple premises, such as, but not limited to, residential location 104, residential location 106, and residential location 108. For example, in one embodiment, network environment 100 may include an optical line terminal (OLT) 142 located at a service provider's central office 140. Optical line terminal 142 serves as the point of origination for FTTx (Fiber-to-the-x) transmissions coming into and out of network environment 100. For instance, in one embodiment, optical fiber 102 connects optical line terminal 142 to one or more neighborhood access units 112 located near end users for providing FTTN (Fiber-to-the-neighborhood) and/or FTTC (Fiber-to-the-curb) services. In one embodiment, neighborhood access units 112 may be an optical network terminal (ONT), also commonly referred to as an optical network unit (ONU). An optical network terminal is a device that converts optical signals to electrical signals. In these embodiments, neighborhood access unit 112 may send the electrical signals via copper lines to individual subscribers. In accordance with one embodiment, neighborhood access units 112 may include a DVR backup application and/or logical components 114 for storing television content in response to detecting a power outage affecting a digital video recorder in which neighborhood access units 112 provides a television feed.

In other embodiments, neighborhood access unit 112 may be an optical splitter that splits a single optical signal into multiple optical signals for providing FTTP (Fiber-to-the-premises) to a plurality of locations, e.g., between 32-128 different locations. In these embodiments, a fiber optic line is connected from neighborhood access unit 112 to an individual optical network terminal, such as, but not limited to, optical network terminal 180 located at residential location 104. In one embodiment, optical network terminal 180 may convert the incoming light signal to one or more electrical signals for providing a plurality of services, such as, but not limited to, voice over IP service, Internet service, and television services. For instance, in one embodiment, central office 140 may communicate with one or more networks, such as, but not limited to, IP network 110, telephone network 120, and cable network 130 for providing services to a plurality of devices within residential location 104, such as, but not limited to, a personal computer 116, a laptop 118, a telephone 122, and a digital video recorder 170. As will be further described, in accordance with some embodiments, optical network terminal 180, instead of, or in addition to, neighborhood access units 112, may include a DVR backup application and/or logical components 182 for storing television content in response to detecting a power outage affecting a digital video recorder, such as, digital video recorder 170, in which optical network terminal 180 provides a television feed.

In one embodiment, IP Network 110 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). Additionally, IP Network 110 may include other types of data networks, such as, but not limited to, an intranet, a private local area network (LAN), a wide area network (WAN), and a wireless local area network (WLAN). In addition, in some embodiments, IP Network 110 may communicate with one or more networks, such as, but not limited to, a telephone network 120 and a cable network 130 for providing services to a plurality of subscribers.

Telephone network 120 may include a public switched telephone network (PSTN). The public switched telephone network is the standard telephone network, consisting generally of copper wires for carrying analog voice data, utilized by most homes. In some embodiments, telephone network 120 may also include digital telephone networks, such as, but not limited to, an integrated services digital network (ISDN) and a fiber distributed data interface (FDDI) network. Additionally, in some embodiments, telephone network 120 may include one or more cellular networks, such as, but not limited to, a Global System for Mobile Communications (GSM) network, a Code-Division Multiple Access (CDMA) network, an Enhanced Data GSM Environment (EDGE) network, and a 3G/4G network.

Cable network 130 may include, but is not limited to, one or more coaxial cable networks, fiber-optic networks, twisted pair networks, and/or satellite networks. In some embodiments, cable network 130 supplies television content to a plurality of subscribers including, but not limited to, residential location 104. For example, in one embodiment, cable network 130 may include one or more cable head ends. A cable head end is a facility that originates and communicates cable/satellite TV services to a plurality of subscribers, such as, but not limited to, digital video recorder 170. In some embodiments, a cable head end may include an IPTV video server for providing IPTV services to a subscriber. IPTV is a service that delivers television content to the viewer through data networks instead of being delivered through traditional broadcast and cable formats. IPTV is typically supplied by a service provider using a closed network infrastructure controlled and engineered by the service provider to ensure efficient bandwidth to deliver vast amounts of multicast video traffic. In addition, In accordance with one embodiment, a cable head end may also receive upstream requests from a digital video recorder/set-top box, such as, but not limited to, receiving a video on demand request or a request for a single or multiple program transport streams (MPTS), e.g., IPTV.

Figure 2:
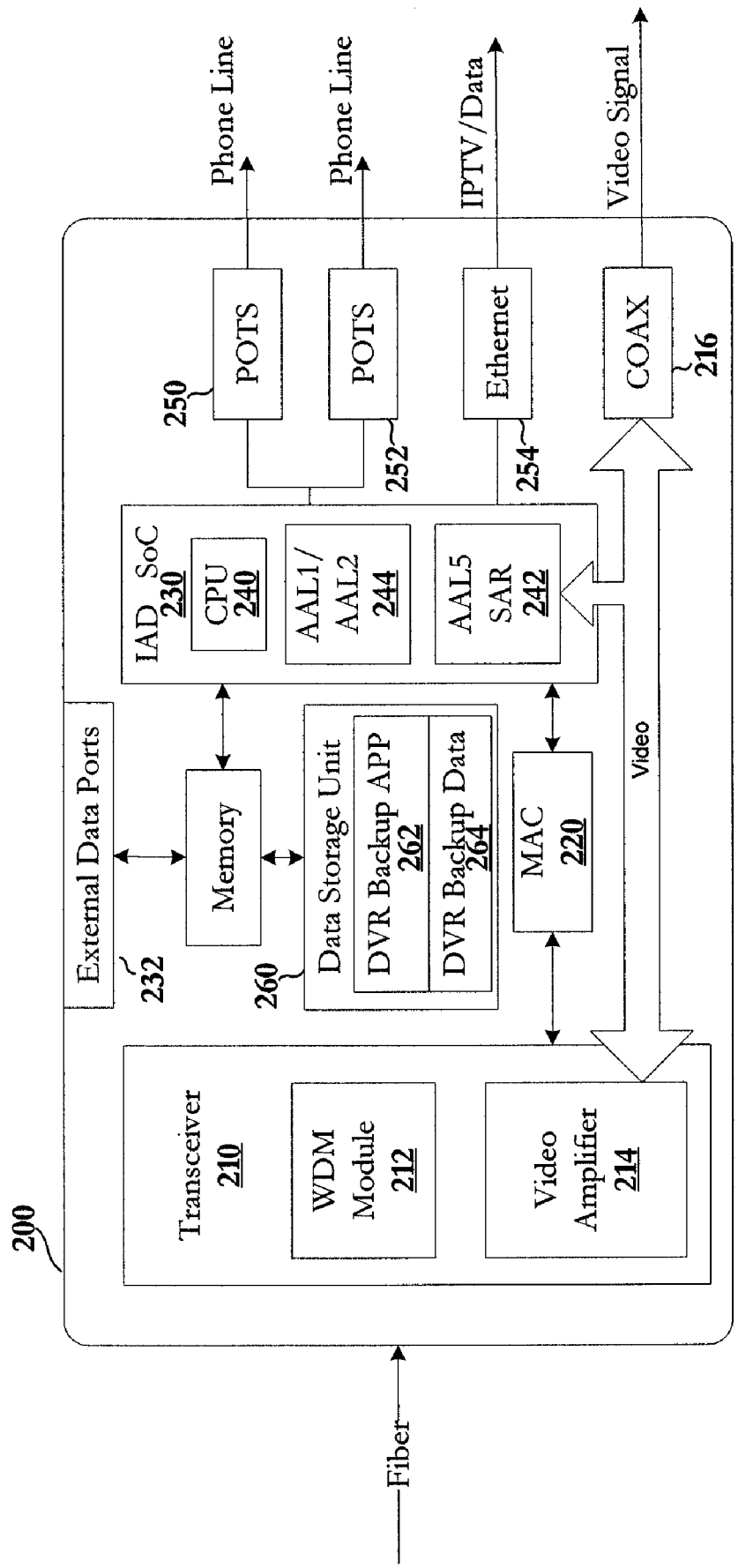
FIG. 2 depicts an embodiment of a optical network terminal in accordance with the illustrative embodiments.

FIG. 2 depicts an embodiment of an optical network terminal 200 in accordance with the illustrative embodiments. In one embodiment, optical network terminal 200 may be a neighborhood access unit, such as, neighborhood access unit 112 as illustrated in FIG. 1. In other embodiments, optical network terminal 200 may be a residential optical network terminal, such as, but not limited to, optical network terminal 180 as illustrated in FIG. 1.

In the depicted embodiment, optical network terminal 200 includes a transceiver 210 for converting a light signal into electrical signals. In one embodiment, transceiver 210 provides the physical connection between the user premises and a service provider's central office, such as, central office 140. In some embodiments, transceiver 210 may include a wavelength-division multiplexing (WDM) module 212. WDM module 212 multiplexes multiple optical carrier signals on a single optical fiber by using different wavelengths of laser light to carry different signals. This allows for a multiplication in capacity, in addition to enabling bidirectional communications over one strand of fiber. For instance, in one embodiment, transceiver 210 may receive data at wavelength 1490 nm and send burst traffic at a wavelength of 1310 nm. In some embodiments, transceiver 210 may include a third wavelength, 1550 nm, used for analog video broadcast. Each of the wavelengths is than manipulated accordingly. In one embodiment, a continuous downstream data (1490 nm) is filtered and amplified by a limiter amplifier integrated circuit. In addition, in some embodiments, the burst upstream data (1310 nm) may be controlled by a burst mode laser driver integrated circuit. Further, in some embodiments, downstream video broadcast streams (1550 nm) may be manipulated by a video amplifier 214 and transferred to a 75 ohm coax connector 216.

Additionally, in one embodiment, optical network terminal 200 includes a media access controller (MAC) 220. Media access controller 220 is responsible for handling the unique transmission control protocol of network environment 100. For example, in one embodiment, media access controller 220 controls the PON burst mode data transfer of network environment 100. For instance, in order to support video on demand and other advanced cable television services, in some embodiments, media access controller 220 must convert the cable set-top return channel to the PON packet stream for delivery over the upstream optical wavelength. In one embodiment, media access controller 220 ensures that data transmitted from residential location 104 upstream to optical line terminal (OLT) 142 does not collide with other data transmitted upstream from other subscriber locations, such as, but not limited to, residential location 106 and residential location 108. In addition, in some embodiments, e.g., if optical network terminal 200 is a neighborhood access unit, media access controller 220 may filter downstream data broadcast from central office 140 to the appropriate residential location.

In some embodiments, optical network terminal 200 may include an integrated access device (IAD) System-on-a chip (SOC) 230 for controlling the functions of optical network terminal 200. For example, in one embodiment, IAD SOC 230 aggregates multiple channels of information including voice and data across a single shared access link to a carrier or service provider. In some embodiments, IAD SOC 230 may include a control processor 240 and may integrate other components including, but not limited to, interrupt controllers, timers, memory controller with data manipulations logic like Asynchronous Transfer Mode (ATM) Adaptation Layer 5 (AAL5) segmentation and reassembly (SAR) 242, and AAL2/AAL1 voice SAR 244. For example, in one embodiment, AAL5 SAR 242 may be used to send variable-length packets across an Asynchronous Transfer Mode (ATM) network. In addition, in some embodiments, IAD SOC 230 may integrate and/or support additional data functions, such as, but not limited to, Internet Protocol Security (IPsec) for enhanced security, one or data ports 232, and Wi-Fi interfaces. For example, in some embodiments, data ports 232 may include a universal serial bus (USB) port for connecting a USB flash drive to optical network terminal 200 for providing external data storage.

In one embodiment, optical network terminal 200 supports one or more individually addressable POTS ports 250 and 252 using an RJ11 jack. For example, in one embodiment, POTS ports 250 and 252 include logic to terminate the Tip and Ring signaling along with a codec to convert analog to digital voice streams. In some embodiments, POTS ports 250 and 252 may include digital signal processing (DSP) to allow voice compression and echo cancellations. In addition, in some embodiments, optical network terminal 200 may support a single 10/100BaseT Ethernet port 254 for 'always-on' high speed Internet services. In accordance with one embodiment, optical network terminal 200 may deliver IPTV services and other Internet data to a subscriber via Ethernet port 254.

In accordance with some embodiments, optical network terminal 200 may include an internal data storage unit 260, such as, but not limited to, a hard disk drive. For instance, in one embodiment, data storage unit 260 may store a digital video recorder backup application 262 comprising computer executable instructions for enabling optical network terminal 200 to record a scheduled television program associated with a digital video recorder, such as, but not limited to, digital video recorder 170, in the event the digital video recorder 170 loses power. For instance, in one embodiment, data storage unit 260 may also store digital video recorder backup data 264. In some embodiments, digital video recorder backup data 264 may include a recording schedule associated with digital video recorder 170 for enabling optical network terminal 200 to determine a scheduled recording program in the event the digital video recorder 170 loses power. In addition, digital video recorder backup data 264 may include one or more recorded programs that were stored by optical network terminal 200 during a time digital video recorder 170 did not have power.

Figure 3:
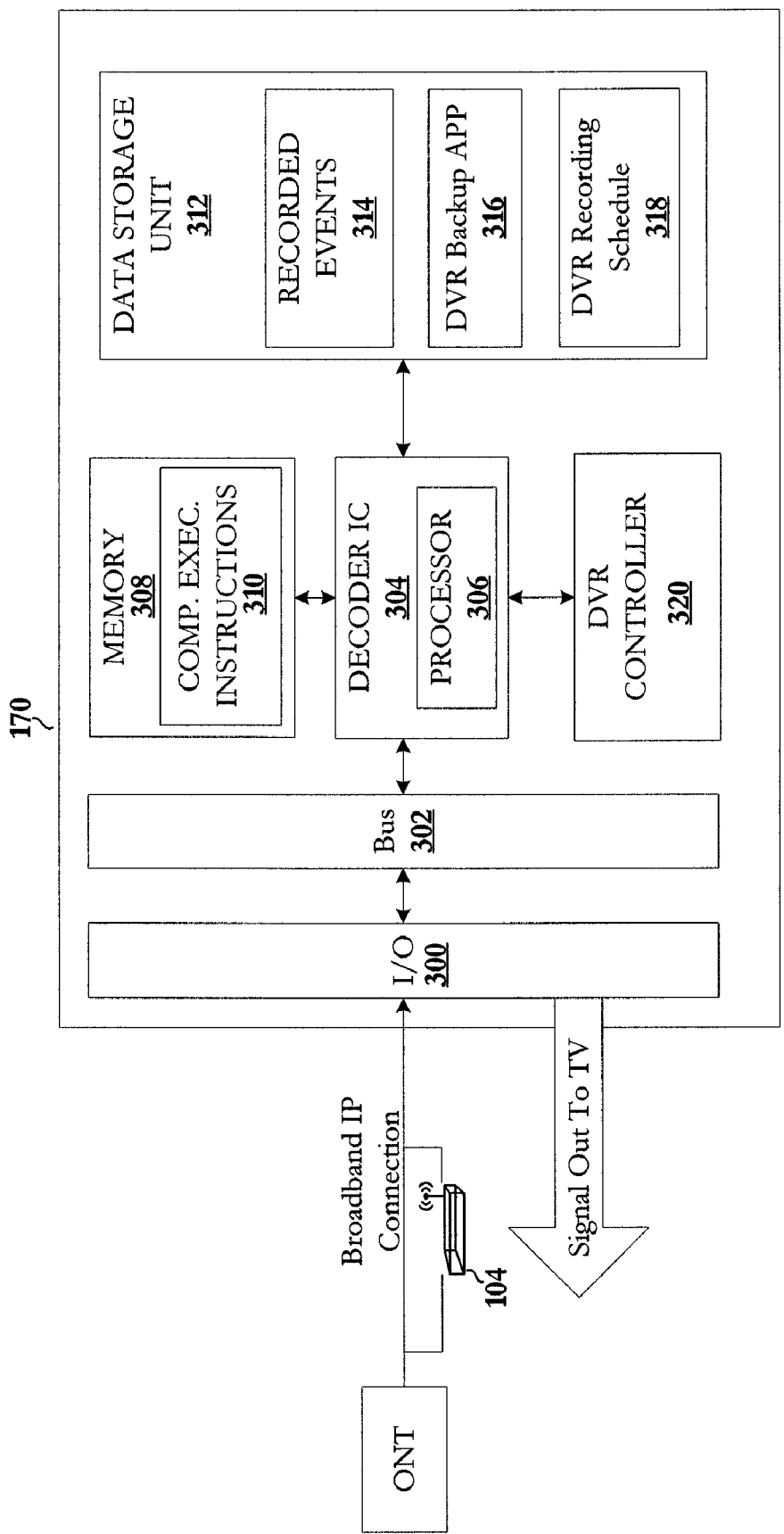
FIG. 3 depicts an embodiment of a digital video recorder for recording television content in accordance with the illustrative embodiments.

FIG. 3 depicts an embodiment of digital video recorder 170 for recording television content in accordance with the illustrative embodiments. In one embodiment, digital video recorder 170 receives IPTV services via a broadband connection from optical network terminal 200. For example, in one embodiment, digital video recorder 170 may include a set of input/output ports 300 for receiving a broadband IP connection directly from an optical network terminal, such as, but not limited to, optical network terminal 180, or from a network router, such as, wireless router 124 located at residential location 104. For example, in some embodiments, the set of input/output ports 300 may include an Ethernet port for connecting digital video recorder 170 to a broadband Internet source for receiving IPTV services and other Internet data. In addition, in some embodiments, the set of input/output ports 300 may provide connection ports for coupling digital video recorder 170 to one or more electronic devices. For example, in one embodiment, the set of input/output ports 300 may include a video output interface, such as, but not limited to, a coaxial cable connection for coupling digital video recorder 170 to a display unit 190 (as depicted in FIG. 1). Additionally, in some embodiments, the set of input/output ports 300 may include other connector ports, such as, but not limited to, a 1394 port, a universal serial bus (USB) port, and/or a high-definition multimedia interface (HDMI).

In one embodiment, the set of input/output ports 300 communicates with other components of digital video recorder 170 via a system bus 302. System bus 302 provides conductive pathways/traces to mechanically support and electrically connect the various components of digital video recorder 170 for enabling viewing and recording of television content.

Additionally, in the depicted embodiment, digital video recorder 170 includes a video decoder integrated circuit 304 for decoding video. In some embodiments, video decoder integrated circuit 304 may include one or more microprocessors 306. In some embodiments, video decoder integrated circuit 304 may support the H.264 standard for video compression and/or other types of video compression, such as, but not limited to, a Moving Picture Experts Group-X (MPEG-X) standard, e.g., MPEG-2 and MPEG-4. Additionally, in some embodiments, video decoder integrated circuit 304 may receive video MPEG transport stream packets and return the decoded video data along with clock and vertical/horizontal synchronization information.

In addition, digital video recorder 170 may include a memory component 308. For instance, in some embodiments, memory component 308 is volatile memory, i.e., memory that loses its contents when digital video recorder 170 loses power. For example, in some embodiments, memory component 308 may be random access memory (RAM). Random access memory stores currently executing instructions 310 and/or other data utilized by an operating system, software program and/or hardware device.

Digital video recorder 170 may also contain one or more data storage units 312. Data storage unit 312 is a non-volatile memory component of digital video recorder 170, such as, but not limited to, a hard disk drive. Non-volatile memory retains stored data when power is lost. In some embodiments, data storage unit 312 may be an external hard drive and/or a removable data storage unit. In accordance with the disclosed embodiments, data storage unit 312 may store a plurality of recorded events/television programs 314. In addition, in one embodiment, data storage unit 312 may store a digital video recorder backup application 316. Digital video recorder backup application 316 comprises of computer instructions for enabling digital video recorder 170 to communicate with an optical network terminal (ONT), such as, but not limited to, optical network terminal 180, for requesting the optical network terminal store a scheduled recording associated with digital video recorder 170 in the event digital video recorder 170 loses power. Additionally, in some embodiments, data storage unit 312 may include a DVR recording schedule 318. In one embodiment, DVR recording schedule 318 contains a list of user-selected shows and their corresponding broadcasting data, such as, but not limited to, a date/time and channel stream corresponding to the broadcast.

In one embodiment, digital video recorder 170 may include a DVR controller module 320 for controlling the recording and playback of a plurality of user-selected television programs. For instance, in one embodiment, DVR controller module 320 utilizes the DVR recording schedule 318 to schedule the recording of a plurality of user-selected television programs. In addition, in accordance with some embodiments, DVR controller module 320 may communicate DVR recording schedule 318 to an optical network terminal for enabling the optical network terminal to record one or more of the user-selected television programs in the event of a power outage.

Figure 4:
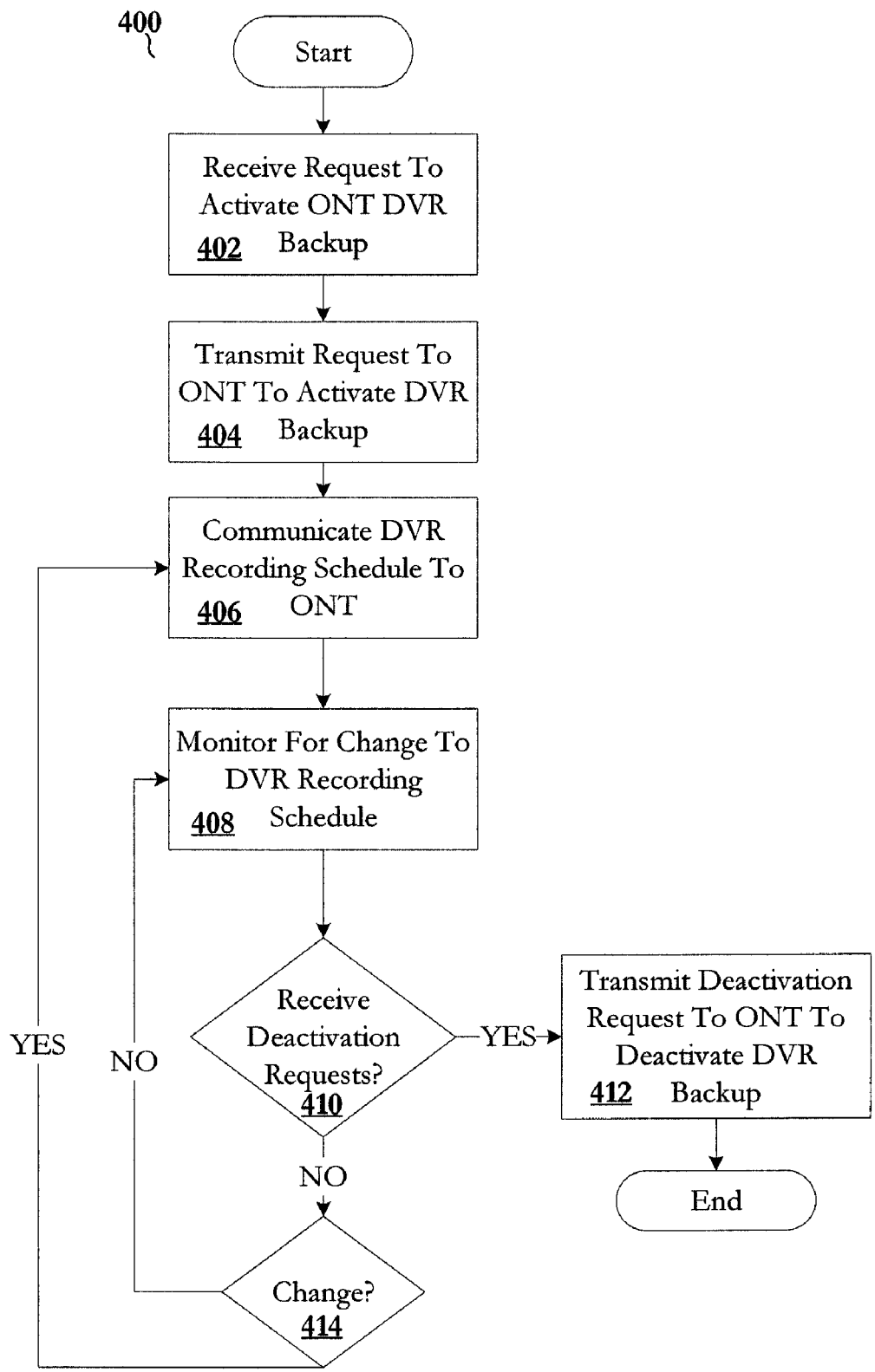
FIG. 4 depicts an embodiment of a user interface associated with a digital video recorder for recording television content in accordance with the illustrative embodiments.
Figure 5:
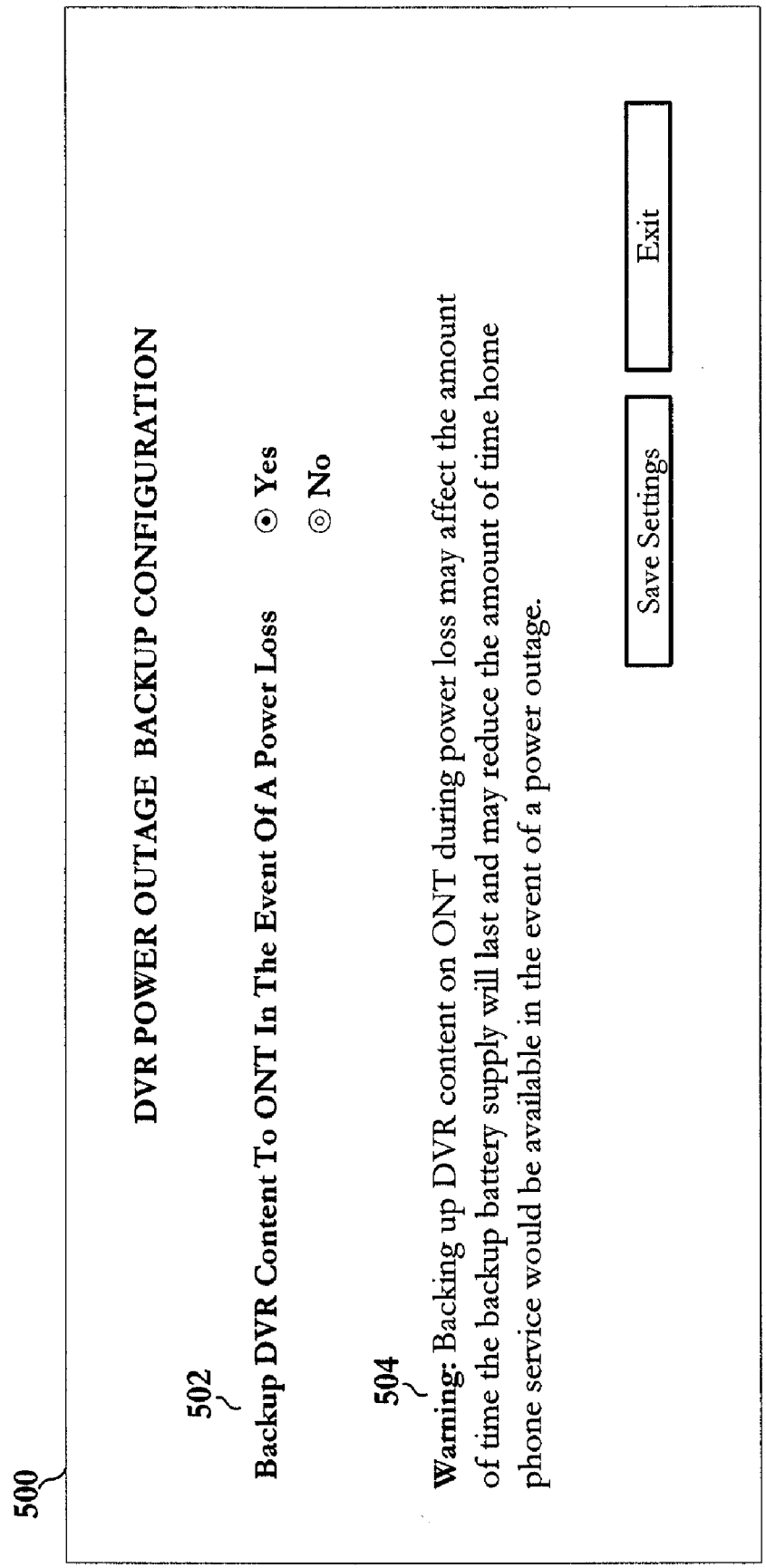
FIG. 5 depicts a flowchart illustrating an embodiment of a process performed by a digital video recorder to initiate a recording backup function on an optical network terminal in accordance with the illustrative embodiments.

For example, FIG. 4 depicts a flowchart illustrating an embodiment of a process 400 performed by a digital video recorder, such as, digital video recorder 170, to initiate a recording backup function on an optical network terminal in accordance with the illustrative embodiments. Process 400 begins, at step 402, by receiving a request to activate a backup recording function on an optical network terminal associated with the digital video recorder in the event the digital video recorder loses power during a scheduled recording of a television program. For example, in one embodiment, process 400 may present an embodiment of a user interface 500, as depicted in FIG. 5, for providing a user-selectable option 502 for enabling a user to elect to have an optical network terminal store a scheduled recording in the event the digital video recorder loses power. In addition, in some embodiments, user interface 500 may present a warning 504 notifying the user that backing up DVR content on the ONT may affect the amount of time the backup battery supply will last and may reduce the amount of time that home phone service may be available in the event of a power outage. Thus, a user that does not have alternative means for communications, such as, but not limited to, a mobile phone, during a power outage may elect not to have the optical network terminal backup a digital video recorder during a power outage.

Continuing on with process 400, in response to receiving a request to activate a backup recording function on an optical network terminal, the process, at step 404, transmits a request to an optical network terminal to activate the backup recording function on the optical network terminal for the digital video recorder. In one embodiment, the process communicates a recording schedule associated with the digital video recorder to the optical network terminal at step 406. At step 408, the process monitors for changes to the DVR recording schedule. In addition, at step 410, the process monitors for a deactivation request for deactivating the backup recording function on the optical network terminal. If the process receives a deactivation request at step 410, the process, at step 412, transmits the deactivation request to the optical network terminal for enabling the optical network terminal to deactivate the backup recording function associated with the digital video recorder, with process 400 terminating thereafter.

However, if the process does not receive a deactivation request, the process, at step 414, determines whether changes to the DVR recording schedule have occurred. For example, the DVR recording schedule may change if a user decides to no longer record a particular television program and/or the user adds additional television programs to be recorded. If the process determines that a change to the DVR recording schedule has occurred, the process returns to step 406, and communicates the updated DVR recording schedule to the optical network terminal. The process continues to monitor for changes to the DVR recording schedule at step 408 and continues to monitor for a deactivation request of the backup recording function at step 410.

Figure 6:
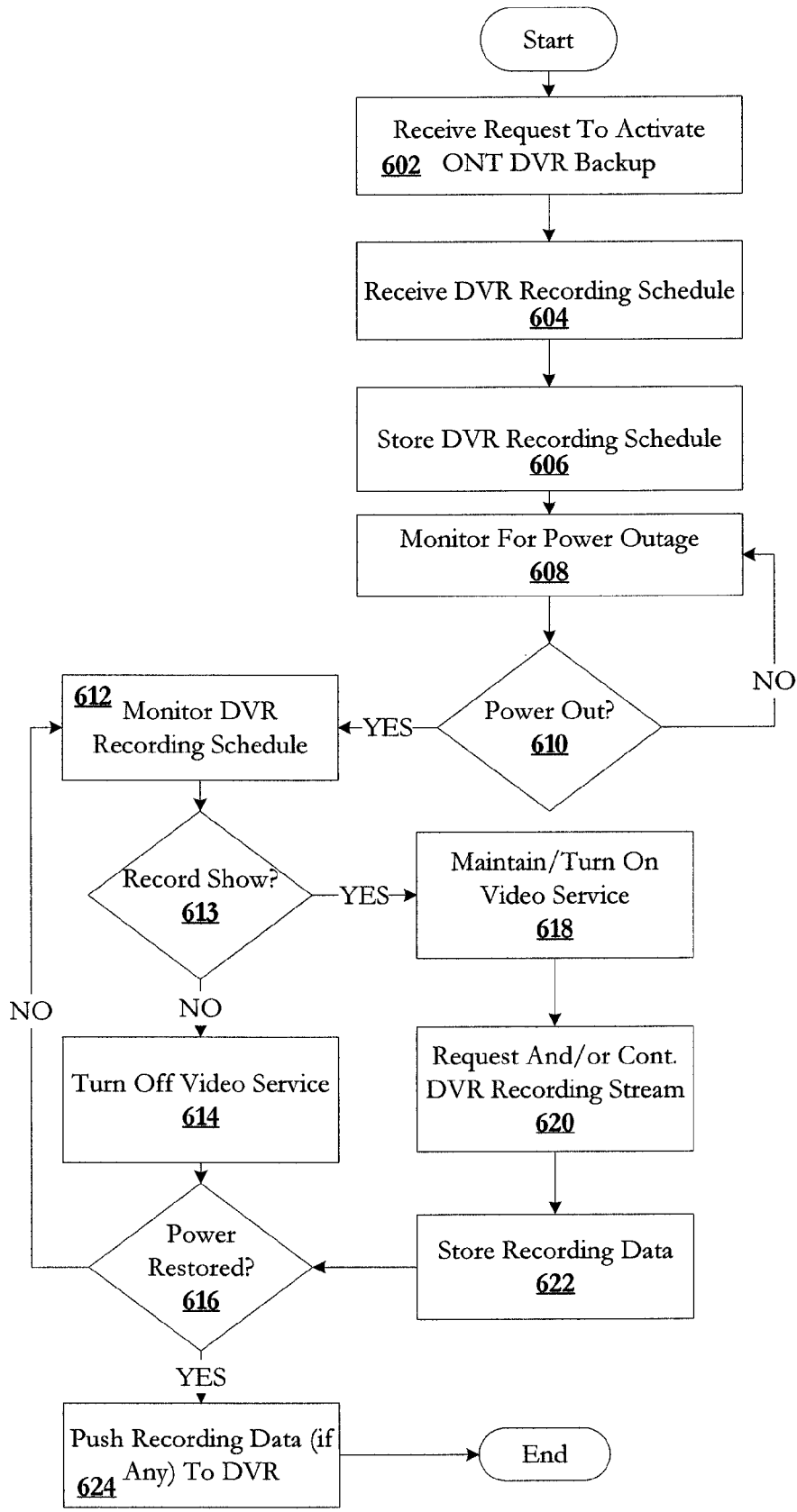
FIG. 6 depicts a flowchart illustrating an embodiment of a process performed by an optical network terminal for recording television content in accordance with the illustrative embodiments.

FIG. 6 depicts a flowchart illustrating an embodiment of a process 600 performed by an optical network terminal, such as, but not limited to, optical network terminal 180, for recording television content in accordance with the illustrative embodiments. Process 600 begins, at step 602, by receiving a request to activate a backup recording function associated with a digital video recorder. In addition, in some embodiments, process 600 may, at step 604, receive a DVR recording schedule associated with the digital video recorder. The process stores the DVR recording schedule at step 606. At step 608, the process monitors for a power outage. For example, in one embodiment, optical network terminal 180 is plugged into an electrical outlet at residential location 104 for receiving external power for providing telephone, Internet, and IPTV services to residential location 104. In one embodiment, if residential location 104 uses power, optical network terminal 108 switches to a battery backup unit for providing temporary power to optical network terminal 108.

In accordance with the disclosed embodiments, in response to detecting a power outage at step 610, the process, at step 612, monitors the DVR recording schedule to determine whether a television program is scheduled to be recorded during the time of the power outage affecting the digital video recorder. If the process determines, at step 613, that a television program is not scheduled to be recorded at the current time, the process, at step 614, turns off the IPTV video/Internet service to conserve the battery backup unit. The process, at step 616, monitors for the power to be restored to the residential location and the digital video recorder. If the power has not been restored to the digital video recorder, the process continues to monitor the DVR recording schedule at step 612.

If at step 612, the process determines that a television program is scheduled to be recorded during the time of the power outage, the process maintains and/or turns on the IPTV Internet/video conversion service at step 618. The process, at step 620, may continue to receive a light signal corresponding to a channel stream associated with a television program that was currently recording during the time of the power loss affecting the digital video recorder. Alternatively, at step 620, the process may request a channel stream, e.g., from an IPTV video server located at central office 140, associated with a television program that was scheduled to be recorded during the power outage. At step 622, the process converts the light signal into digital format and stores the converted digital file in a data storage unit associated with the optical network terminal. The process continues to record the channel stream corresponding to the television program that was scheduled to be recorded during the time of the power outage either until the scheduled television program ends, the optical network terminal runs out of data storage space or backup battery power, or until the process determines that external power is restored at step 616. Once external power has been restored, the process pushes the stored data, if any, to the digital video recorder at step 624, with process 600 terminating thereafter.

Figure 7:
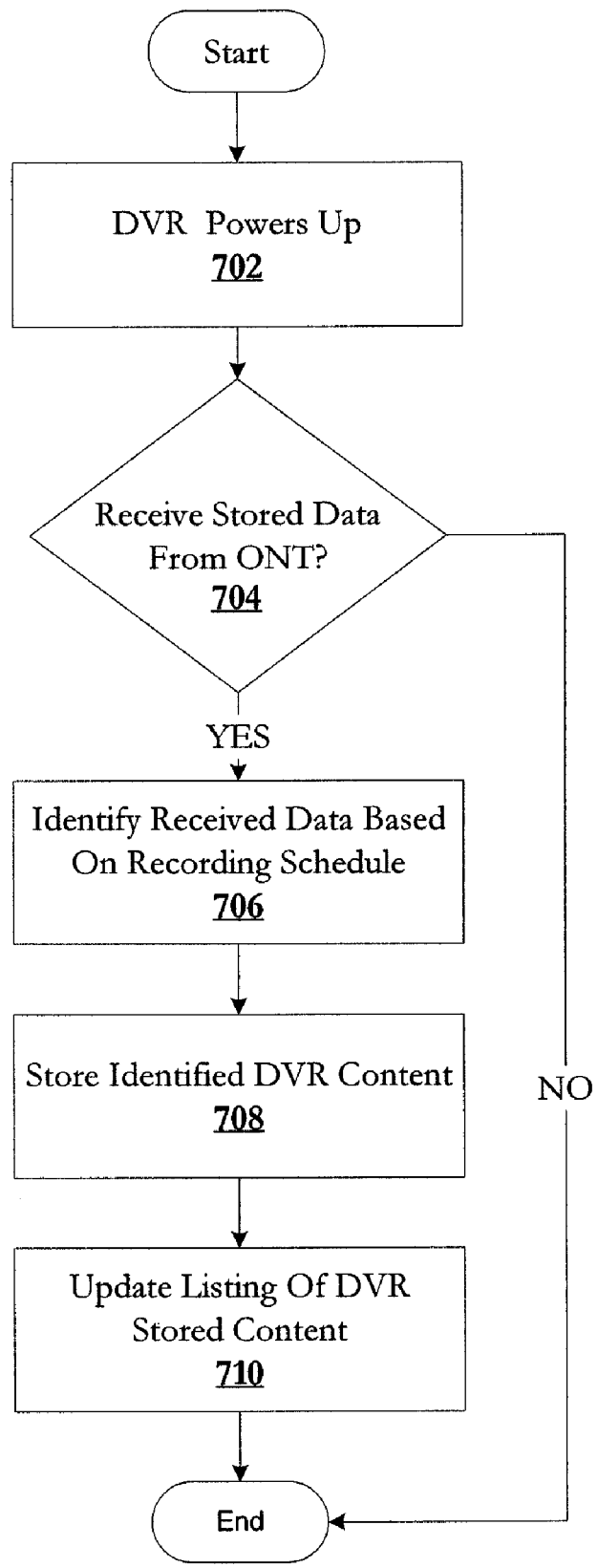
FIG. 7 depicts a flowchart illustrating an embodiment of a process performed by a digital video recorder to receive television content from an optical terminal network in accordance with the illustrative embodiments.

FIG. 7 depicts a flowchart illustrating an embodiment of a process 700 performed by a digital video recorder, such as, but not limited to, digital video recorder 170, to receive television content from an optical terminal network in accordance with the illustrative embodiments. Process 700 begins, at step 702, by initiating a power up sequence for a digital video recorder. At step 704, the process determines whether stored data is received from an optical network terminal associated with the digital video recorder. For instance, in some embodiments, the process may automatically receive stored data from an optical network terminal during or immediately after powering up. In other embodiments, the process may initiate a request to the optical network terminal for any stored data. If the process does not receive stored data from the optical network terminal, the process performs the usual power up sequence for the digital video recorder, with process 700 terminating thereafter.

However, if the process receives stored data from the optical network terminal at step 704, the process, at step 706, identifies the received data based on information contained in the received data and/or based on information contained in a recording schedule. At step 708, the process stores the identified DVR content in a data storage unit associated with the digital video recorder. The process, at step 710, updates a listing of DVR content associated with the digital video recorder, with process 700 terminating thereafter.

In addition, in some embodiments, process 700 may include steps for concatenating together one or more data files associated with the same television program. For example, suppose digital video recorder 170 initiated recording of television program X prior to a power outage, and optical network 180 recorded a portion of television program X during the power outage, and digital video recorder 170 recorded the remaining portion of television program X after power was restored. In one embodiment, process 700 may concatenate/combine the 3 parts of television program X into a single data file for enabling easier playback of television program X. Alternatively, in some embodiments, digital video recorder 170 may simply list the 3 parts of television program X separately and require that the user manually select each part individually for playback.

Accordingly, certain of the disclosed embodiments present a system and method for recording television content in the event of a power loss. The disclosed embodiments enable a user to view portions, if not all, of a television program that would have been missed due to a power outage affecting a digital video recorder. For instance, in one embodiment, a method performed by an optical network terminal is disclosed that includes monitoring for a power outage affecting a digital video recorder associated with the optical network terminal. In response to detecting the power outage, the method determines whether the digital video recorder is scheduled to record a program during a time coinciding with the power outage. In response to determining that the digital video recorder is scheduled to record a program during the time coinciding with the power outage, the method maintains video service on the optical network terminal associated with providing video service to the digital video recorder. The method stores video data corresponding to the program on a data storage unit associated with the optical network terminal. The method transfers the stored video data corresponding to the program from the data storage unit to the digital video recorder after power is restored to the digital video recorder.

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

We claim:

1. A method for recording television content in the event of a power loss, the method comprising:
    monitoring for a power outage affecting a digital video recorder;
    responsive to detecting the power outage, determining whether the digital video recorder is scheduled to record a program during a time coinciding with the power outage;
    responsive to determining that the digital video recorder is scheduled to record a program during the time coinciding with the power outage, maintaining video service on an optical network terminal associated with providing video service to the digital video recorder;
    storing video data corresponding to the program on a local data storage unit of the optical network terminal; and
    responsive to determining that the power to the digital video recorder is restored, transferring the stored video data corresponding to the program from the local data storage unit of the optical network terminal to the digital video recorder.

2. The method of claim 1, further comprising receiving an activation request from the digital video recorder to initiate the step of monitoring for a power outage affecting the digital video recorder.

3. The method of claim 1, further comprising receiving a recording schedule from the digital video recorder.

4. The method of claim 3, further comprising receiving an updated recording schedule from the digital video recorder in response to a change to the recording schedule.

5. The method of claim 1, further comprising responsive to determining that the digital video recorder is not scheduled to record a program during the time coinciding with the power outage, turning off the video service on the optical network terminal to conserve backup power.

6. The method of claim 1, wherein the local data storage unit of the optical network terminal is an external USB flash drive.

7. The method of claim 1, further comprising requesting the video data corresponding to the program from an IPTV head end.

8. The method of claim 1, wherein transferring the stored video data corresponding to the program from the local data storage unit of the optical network terminal to the digital video recorder is performed automatically by the optical network terminal.

9. The method of claim 1, wherein transferring the stored video data corresponding to the program from the local data storage unit of the optical network terminal to the digital video recorder is performed in response to receiving a request from the digital video recorder for any stored programming content after power to the digital video recorder is restored.

10. A method for recording television content in the event of a power loss, the method comprising:
receiving locally stored data from an optical network terminal after initiating a power up sequence associated with a digital video recorder;
associating the data with a scheduled program;
storing the locally stored data received from the optical network terminal on a data storage unit associated with the digital video recorder; and
updating a list of recorded content to include the scheduled program.

11. The method of claim 10, further comprising:
receiving a request to activate a backup feature for the digital video recorder;
transmitting a request to the optical network terminal associated with providing television content to the digital video recorder; and
transmitting a recording schedule associated with the digital video recorder to the optical network terminal.

12. The method of claim 10, further comprising:
determining whether the data is only a part of the scheduled program; and
responsive to a determination that the data is only a part of the scheduled program, appending the data to other parts associated with the scheduled program.

13. An optical network terminal configured to store television content in the event of a power loss to a digital video recorder, the optical network terminal comprising:
a transceiver for receiving the television content;
an external power source unit for receiving power from an external source;
a battery backup unit for providing power to the optical network terminal in the event external power is unavailable;
a system-on-a-chip configured to identify a power outage and initiate recording of a scheduled program associated with the digital video recorder during the power outage; and
a non-network, local data storage unit for storing the scheduled program recording locally on the optical network terminal.

14. The optical network terminal of claim 13, wherein the local data storage unit of the optical network terminal further stores a list of scheduled program recordings associated with the digital video recorder.

15. The optical network terminal of claim 13, wherein the local data storage unit of the optical network terminal is a removable USB flash drive.

16. The optical network terminal of claim 13, wherein the system-on-a-chip is further configured to transfer the stored scheduled program recording to the digital video recorder in response to a determination that the digital video recorder has regained power.

17. The optical network terminal of claim 13, wherein the system-on-a-chip is further configured to transfer the stored scheduled program recording to the digital video recorder in response to receiving a request from the digital video recorder for the stored scheduled program recording.

18. The optical network terminal of claim 13, wherein the system-on-a-chip is further configured to communicate with a cable head end for requesting the television data associated with the scheduled program.

19. The optical network terminal of claim 13, wherein the system-on-a-chip is further configured to receive an activation request from the digital video recorder to activate the feature of recording of a scheduled program associated with the digital video recorder during the power outage.

20. The optical network terminal of claim 13, wherein the system-on-a-chip is further configured to deactivate the video service on the optical network terminal during a time that the optical network terminal is not recording a scheduled program associated with the digital video recorder during the power outage.

* * * * *